US000002035H

(19) United States

(12) Statutory Invention Registration (10) Reg. No.: US H2035 H

Halliwell (43) Published: Jul. 2, 2002

(54) METHOD FOR APPLYING A POLYMER COATING TO A SUBSTRATE

(75) Inventor: Michael J. Halliwell, Dayton, OH (US)

(73) Assignee: The United States of America as represented by the Secretary of the Air Force, Washington, DC (US)

(21) Appl. No.: 09/556,928

(22) Filed: Apr. 21, 2000

(51) Int. Cl.[7] ..... B05D 1/02

(52) U.S. Cl. ..... 427/447

(58) Field of Search ..... 427/447

(56) References Cited

U.S. PATENT DOCUMENTS

| | | | | |
|---|---|---|---|---|
| 3,723,165 A | * | 3/1973 | Longo et al. | 427/447 |
| 4,206,248 A | | 6/1980 | Schmidlin | 427/27 |
| 4,707,379 A | * | 11/1987 | Neufuss et al. | 427/113 |
| 4,812,335 A | | 3/1989 | Kuwajima et al. | 427/407.1 |
| 5,041,713 A | | 8/1991 | Weidman | 219/121.51 |
| 5,106,910 A | | 4/1992 | Weidman et al. | 525/178 |
| 5,285,967 A | | 2/1994 | Weidman | 239/80 |
| 5,322,715 A | | 6/1994 | Jouck et al. | 427/409 |
| 5,439,710 A | | 8/1995 | Vogt et al. | 427/407.1 |
| 5,585,146 A | | 12/1996 | Uenaka et al. | 427/407.1 |

OTHER PUBLICATIONS

Metals Handbook, Ninth Edition, vol. 5: Surface Cleaning, Finishing, and Coating, American Society for Metals, pp. 361 and 375, 1982.*

* cited by examiner

*Primary Examiner*—Daniel T. Pihulic

*Assistant Examiner*—Aileen J. Baker

(74) *Attorney, Agent, or Firm*—Bobby D. Scearce; Thomas L. Kundert

(57) ABSTRACT

Corrosion resistant non-polar polymer coatings and method for applying the coatings to substrates is described, wherein a source of non-polar polymer powder is deposited as a coating onto the surface of a substrate by high temperature thermal spray, wherein the non-polar character of the powder and any additives thereto is substantially preserved during the high temperature thermal spray by using a mixture of a non-oxidizing shielding gas or reducing gas, or combination of the two, at one or more locations along the thermal spray to displace or react with ambient oxygen.

18 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD FOR APPLYING A POLYMER COATING TO A SUBSTRATE

RIGHTS OF THE GOVERNMENT

The invention described herein may be manufactured and used by or for the Government of the United States for all governmental purposes without the payment of any royalty.

BACKGROUND OF THE INVENTION

The present invention relates generally to corrosion resistant coatings for metallic or nonmetallic substrates, and more particularly to novel non-polar or non-polarizable polymer corrosion resistant coatings and system and method for applying the coatings.

Conventional corrosion control or prevention coatings for metallic substrates typically use polar polymers in order to enhance adhesion to the substrate. However, the polar bonds represent a weakness in the coating of potentially allowing adsorption and transport of water and dissolved ions to the substrate and consequent corrosion of the substrate.

The invention solves or substantially reduces in critical importance the problems with corrosion resistant polymer coatings in the prior art wherein non-polar and preferably also non-polarizable polymer powders are deposited by high temperature thermal and impact energy spray or plasma spray process as coatings for corrosion protection for metallic substrates. High temperature is considered herein to mean a temperature at which oxidation of the polymer may occur. Water, being a polar molecule, has an affinity for other polar molecules, including polar polymers, additives and substrates, but has no affinity for non-polar polymers. Accordingly, the non-polar materials in the coatings of the invention act to prevent water and dissolved ions from absorbing in, percolating through, or deteriorating the coating, and coating/substrate interface which allows corroding of the substrate. Because non-polar polymers do not usually adhere well to most substrates, the surface of the substrate may need to be roughened, such as by mechanical roughening (abrasion, sanding or the like) or by applying a semi-molten metal fiber or particle layer to the substrate prior to coating. The invention is further enhanced if the metal is a less corrosion prone version of the substrate metal being protected.

Another aspect of the invention is the prevention of non-polar polymers, additives and fillers from being polarized by oxidation during the high temperature thermal spray, plasma spray, or subsequent cure of the coating. In accordance with the teachings of the invention, oxidation may be prevented first by using a mixture of a shielding gas or reducing gas, or combination of the two, at one or more locations along the thermal spray to capture or preferentially react with ambient oxygen or residual oxy/fuel thermal spray oxygen.

An additional advantage of the invention is substantial elimination of voids in the sprayed coating resulting from the momentum of impact from the velocity sprayed powder particles. Adsorption of water within thermal sprayed powder coatings is avoided by the elimination of free volume voids. The free volume in conventional coatings results from evaporation of solvents, condensing coatings with random voids, condensation chain extensions of oligomers with random voids, or cross-linking with random residual voids.

It is therefore a principal object of the invention to provide an improved corrosion resistant coating for metallic or non-metallic substrates.

It is a further object of the invention to provide a corrosion resistant coating using non-polar and non-polarizable polymers.

It is another object of the invention to provide low-cost corrosion resistant polymer coatings.

It is another object of the invention to provide void-free corrosion resistant polymer coatings for metallic substrates and method for applying the void-free coatings.

It is a further object of the invention to provide an improved method for applying corrosion resistant polymer coatings without oxidation of the polymer.

It is another object of the invention to provide an improved device to implement shielding with reducing gas for high velocity, high temperature thermal spray.

It is yet another object of the invention to provide a device, gas, or method for shielding the powder from oxidation during the spray process.

These and other objects of the invention will become apparent as the detailed description of representative embodiments proceeds.

SUMMARY OF THE INVENTION

In accordance with the foregoing principles and objects of the invention, corrosion resistant non-polar polymer coatings and method for applying the coatings to substrates is described, wherein a source of non-polar polymer powder is deposited as a coating onto the surface of a substrate by high temperature thermal spray, wherein the non-polar character of the powder and any additives thereto is substantially preserved during the high temperature thermal spray by using a mixture of a non-oxidizing shielding gas or reducing gas, or combination of the two, at one or more locations along the thermal spray to displace or react with ambient oxygen.

DESCRIPTION OF THE DRAWINGS

The invention will be more clearly understood from the following detailed description of representative embodiments thereof read in conjunction with the accompanying drawings wherein.

DETAILED DESCRIPTION

Figure 1:
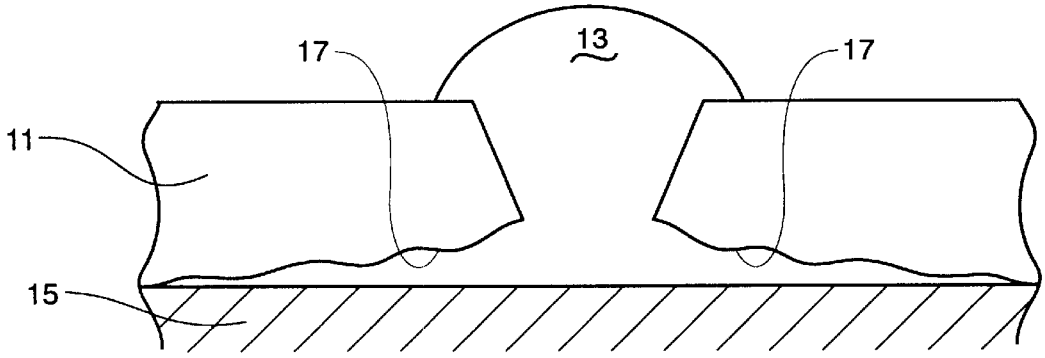
FIG. 1 is a schematic illustration in a sectional view of the undercutting of a polar polymer coating by water absorption and migration.

Referring now to FIG. 1, shown therein is an illustration of the disbandment of a polar polymer from the substrate from acid/base substitutions and/or chemical degradation, such as saponification process of a polar polymer coating and rapid further subsequent migration, absorption and undercutting of the coating by water and its contained chemical ions when driven by the accompanying created oxygen starvation galvanic corrosion potential cell activity. Contact of the polar polymer coating 11 with water 13 and its contained ions can result in the degradation of the polymer which may result in eventual contact of the water 13 and its contained ions with substrate 15 and undercutting and separation 17 of coating 11 from substrate 15. Severe corrosion of substrate 15 by water and its contained ions may then result. Water 13 with sufficient ion content at high enough pH could chemically degrade the polymer coating 11.

Figure 2:
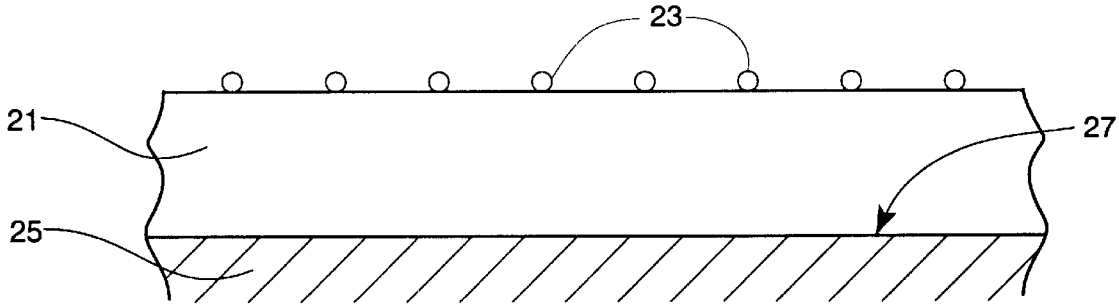
FIG. 2 shows a sectional view of a non-polar polymer coating deposited on a substrate in accordance with the invention and illustrating water beading on the coating without absorption.

Referring now to FIG. 2, shown therein is an example non-polar polymer coating 21 applied to substrate 25 according to the invention. Water 23, being a polar molecule, in contact with coating 21 beads up on the non-polar polymer without absorption into the polymer, because the existence of non-polar covalent bonds only in the polymer provides chemical resistance and the lack of polar sites prevents moisture absorption or percolation. In accordance therefore with a principal feature of the invention, coating 21 of the invention comprises a non-polar or non-polarizable polymer that may be applied to a substrate 25 according to methods suggested herein below. Polymers that may be used in the practice of the invention in obtaining a corrosion resistant coating for a substrate may therefore be selected from polymer materials including thermoplastic type polymers including ultra-high molecular weight polyethylene (UMPE), polyethylene, high density polyethylene, polypropylene, nylon, polytetrafluoroethylene (TEFLON), polyvinyl-chloride, polybutylene, tar, wax, latex, polyvinylidene chloride, or other flowable powders, including pure and non-polar polymer copolymers of acrylic, polycarbonate, polyaramid (KEVLAR), polysulfone, polyimide, polymethylmethacrylate, cellulose acetate, polyurethane, phenolics, nitrophenolics, polyetheretherketone (PEEK), phenol-formaldehyde, polystyrene, acrylonitrile butadiene styrene (ABS), nylon, or thermoset polymers including acrylic, polycarbonate, polyaramid (KEVLAR), polysulfone, polyimide, polymethylmethacrylate, polyester, epoxy, vinyl ester, polyurethane, phenolic, styrene butadiene (SBR), silicone, polyimide, polyurea, or nitrophenolics. Although powder size range is not critical to the process described herein, the preferred size range for polymer powders useful in the practice of the invention may be from about 1 to about 250 microns. Non-polar or non-polarizable additives to the selected polymer (for example, for purposes of flow control or crystallinity control within the polymer) may include pigments and beads based on polypropylene, polyethylene, Nylon 12, polyvinyl chloride (PVC), TEFLON, and pigments surface created to prevent water absorption or penetration, with, for example, stearic acid, silanes, silicon, or cross-linked barrier films such as parylene (polyparaxylylene) or other similar materials occurring to one skilled in the applicable art guided by these teachings, which may also enhance the water repellant attribute and consequently the corrosion resistance of the polymer coating.

It is noted that non-polar polymers do not adhere to metallic substrates as well as polar polymers do. Accordingly, in the application of polymer coatings to metal substrates according to the invention, it is preferred that substrate surface 27 first be cleaned by any suitable process known in the applicable art, and then surface 27 may be roughened, such as by mechanical roughening, prior to the application of the polymer coating. Roughness to approximately 0.002 inch average was found sufficient for satisfactory adherence of polymer coating 21 to substrate 25.

Figure 3:
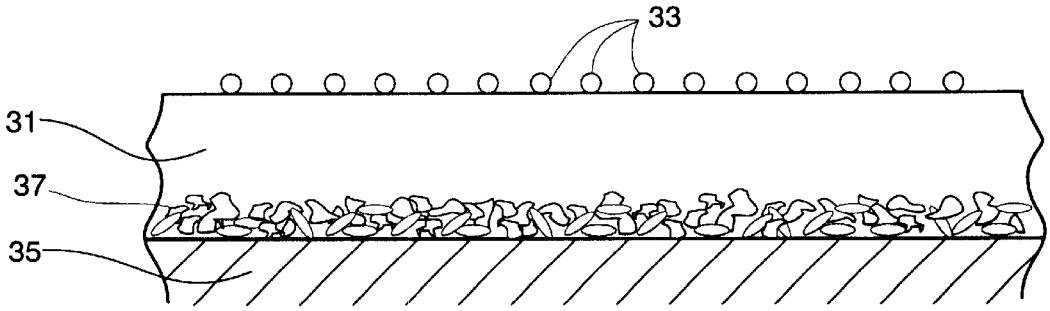
FIG. 3 is a schematic sectional view of a non-polar polymer coating of the invention applied over a substrate having a particulate layer first applied thereon.

Alternatively, as suggested in FIG. 3, a roughened surface on substrate 35 may be provided in the form of a layer 37 of metal fibers and/or particles applied to the surface of substrate 35 by any suitable means known in the art, such as by thermal or arc plasma spray. The application of a non-polar or non-polarizable polymer coating 31 over layer 37 as suggested in FIG. 3 will result in polymer penetration into and mechanical interlocking with the rough surface of layer 37. Polymer layer 31 adheres to metal substrates to which the polymer might otherwise not satisfactorily adhere, and is resistant to penetration from water 33. A sprayed metallic layer 37 may also provide galvanic protection to the substrate. Substrates 25,35 may optionally be heated during the spraying process by means (not shown) in order to prevent premature cooling of the applied polymer coating.

Figure 4:
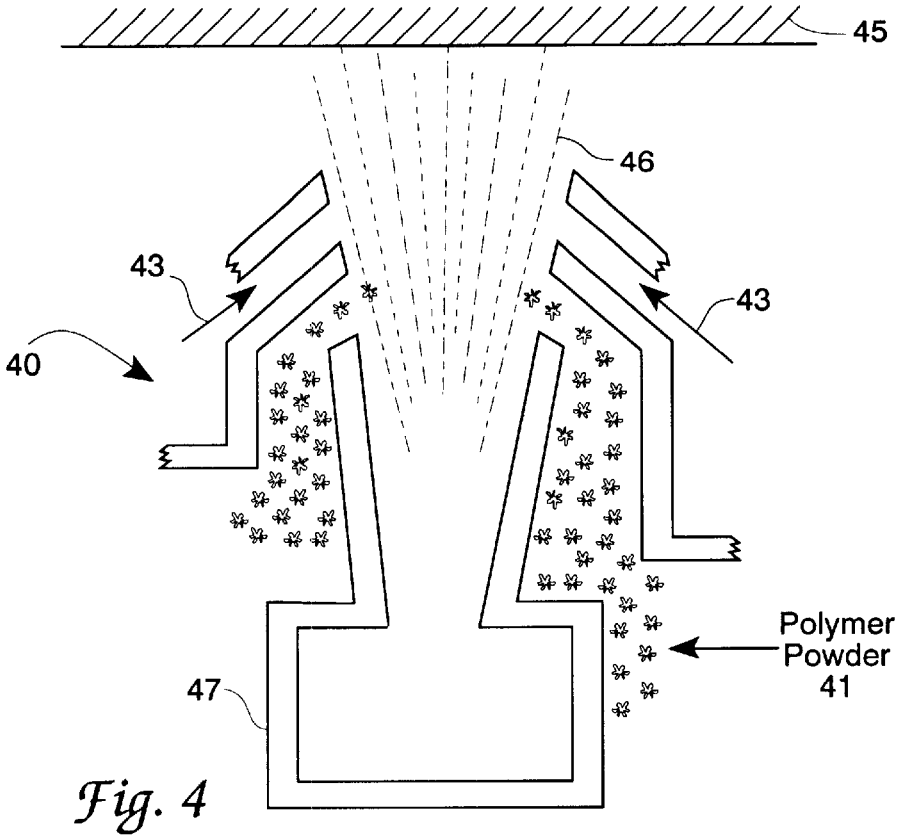
FIG. 4 shows schematically in axial section a thermal spray device useful in the application of polymer powder spray with the insertion of reducing and shielding gases to prevent oxidation and polarization in the polymer during coating of a substrate according to the invention.

Referring now to FIG. 4, shown therein is a schematic illustration in axial section of thermal spray device 40 useful in the application of polymer powder spray 41 with the insertion of reducing or shielding gases 43, or combination thereof, to prevent oxidation and polarization in the non-polar or non-polarizable polymer, additives and fillers during thermal spray coating of substrate 45 in accordance with the invention. In the operation of device 40, a high velocity spray 46 originates within combustion chamber 47. Spray device 40 may be in the form of high or low velocity thermal spray gun, plasma spray gun, fluidized bed, electrostatic spray gun, or other device suitable for applying the desired coating. Application of the high temperature polymer powder spray may best be accomplished utilizing commercially available high-velocity thermal spray equipment manufactured by Weidman Inc., Fort Myers, Fla. Combustion chamber 47 may be of any suitable type for the intended purpose, such as metal or ceramic, fueled by propylene, propane, methane, natural gas, acetylene, or hydrogen. Operating temperature for thermal spray device 40 is typically in the range of from about 200 to 1,500° F. (preferably about 1,000° F.). The high velocity spray is typically applied at about 10 to 900 miles per hour (mph) (preferably about 700 mph).

Figure 5:
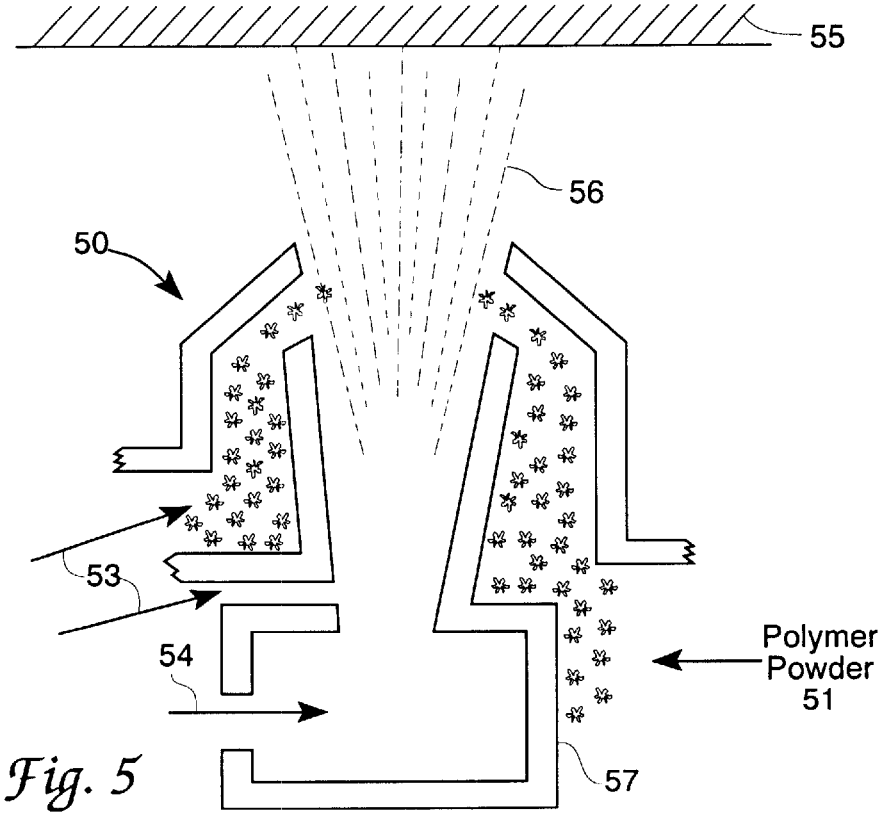
FIG. 5 is a schematic illustration in axial section of a thermal spray device useful in the application of polymer powder spray with the insertion of excess reducing gas in the combustion chamber, and insertion of reducing and/or shielding gases along the thermal spray direction for preventing oxidation and polarization of the polymer powder in the spray.

Oxidation of the sprayed materials within thermal spray 46 may be avoided using a mixture of shielding and reducing gases 43 at substantially any location or combination of locations along the direction of thermal spray 46 between combustion chamber 47 and substrate 45. For example, in FIG. 5 thermal spray device 50 useful in the application of polymer powder 51 spray provides for the addition of excess reducing gas 54 in combustion chamber 57, in addition to the insertion of reducing and/or shielding gases 53 at one or more locations along the thermal spray 56 direction, including insertion with polymer powder 51. Any suitable shielding gas or reducing gas may be used as might occur to the skilled artisan as appropriate for the intended purpose, including shielding gases such as carbon dioxide, nitrogen, argon, helium, krypton, carbon monoxide, or neon, and reducing gases such as hydrogen, methane, ethane, propane, butane, pentane, hexane, septane, octane, nonane, decane, alcohols, acetylene, propylene, ethylene, butylene, pentylene, hexylene, septylene, octylene or hydrogen sulfide, and any selected mixture of suitable shielding and reducing gases. A preferred gas mixture used in demonstration of the invention was 90% carbon dioxide and 10% hydrogen. Tests using this mixture with UMPE on a high velocity, thermal spray machine showed a three-fold increase in corrosion resistance lifetime of a deposited polymer coating in a salt spray test chamber as compared to a coating applied without protective gas.

As noted above, a significant additional advantage is realized in the high velocity high temperature application of non-polar polymer coatings, in that the momentum of the powder particles striking the substrate results in a substantially void free coating that further precludes the adsorption of water into the coating and subsequent corrosion of the substrate.

The invention therefore provides a novel non-polar or non-polarizable polymer corrosion resistant coatings and system and method for applying the coatings. It is understood that certain modifications to the invention may be made as might occur to one skilled in the field of the invention within the scope of the appended claims. All embodiments contemplated hereunder that achieve the objects of the invention have therefore not been shown in complete detail. Other embodiments may be developed without departing from the spirit of the invention or from the scope of the appended claims.

I claim:

1. A method for applying a corrosion resistant non-polar polymer coating to a substrate comprising the steps of:

(a) providing a source of non-polar polymer powder, (b) generating a high temperature thermal spray of said powder for spraying said powder onto a substrate;

(c) introducing into said thermal spray at least one gas for substantially displacing or reacting with oxygen in said thermal spray and substantially preserving the non-polar character of said powder during the step of spraying said powder onto a substrate; and (d) applying said powder as a coating onto said substrate using said thermal spray.

2. The method of claim 1 wherein said non-polar polymer powder comprises a thermoplastic type polymer selected from the group consisting of polyethylene, ultra-high molecular weight polyethylene, high density polyethylene, polypropylene, nylon, polytetrafluoroethylene, polystyrene, polyester, acrylic, polymethylmethacrylate, acrylonitrile butadiene styrene, polyvinyl-chloride, polybutylene, polycarbonate, polyaramid, polysulfone, polyimide, tar, wax, latex, polyurethane, polyvinylidene chloride, cellulose acetate, phenolics, nitrophenolics, polyetheretherketone, and phenol-formaldehyde, or a thermoset type polymer selected from the group consisting of polyester, epoxy, acrylic, vinyl ester, polyurethane, phenolic, styrene butadiene, silicone, polyimide, polyurea, polysulfone, and nitrophenolics.

3. The method of claim 1 wherein the step of generating a high temperature thermal spray of said powder is performed using a thermal spray gun.

4. The method of claim 3 wherein said powder is sprayed at a velocity of about 10 to 900 mph.

5. The method of claim 4 wherein said powder is sprayed at a velocity of about 700 mph.

6. The method of claim 1 wherein said polymer powder is in the size range of from about 1 to about 250 microns.

7. The method of claim 1 wherein said at least one gas is selected from the group consisting of carbon dioxide, nitrogen, argon, helium, krypton, carbon monoxide, neon, hydrogen, methane, ethane, propane, butane, pentane, hexane, septane, octane, nonane, decane, alcohols, acetylene, propylene, ethylene, butylene, pentylene, hexylene, septylene, octylene and hydrogen sulfide.

8. The method of claim 7 wherein the step of introducing at least one gas is performed using a gas mixture consisting essentially of 90% carbon dioxide and 10% hydrogen.

9. The method of claim 1 further comprising the steps of providing said substrate, cleaning a surface of said substrate to which said polymer coating is to be applied, and roughening said surface to a roughness of about 0.002 inch average prior to the application of said polymer coating.

10. A method for applying a corrosion resistant non-polar polymer coating to a substrate comprising the steps of:

(a) providing a substrate for receiving a polymer coating;

(b) spraying onto said substrate a layer of metal fibers or particles;

(c) providing a source of non-polar polymer powder;

(d) generating a high temperature thermal spray of said powder for spraying said powder onto said substrate;

(e) introducing into said thermal spray at least one gas for substantially displacing or reacting with oxygen in said thermal spray and substantially preserving the non-polar character of said powder during the step of spraying said powder onto a substrate; and (f) applying said powder as a coating onto said substrate using said thermal spray.

11. The method of claim 10 wherein the step of spraying said substrate with a layer of metal fibers or particles is performed using a thermal spray process.

12. The method of claim 10 wherein said non-polar polymer powder comprises a thermoplastic type polymer selected from the group consisting of polyethylene, ultra-high molecular weight polyethylene, high density polyethylene, polypropylene, nylon, polytetrafluoroethylene, polystyrene, polyester, acrylic, polymethylmethacrylate, acrylonitrile butadiene styrene, polyvinyl-chloride, polybutylene, polycarbonate, polyaramid, polysulfone, polyimide, tar, wax, latex, polyurethane, polyvinylidene chloride, cellulose acetate, phenolics, nitrophenolics, polyetheretherketone, and phenol-formaldehyde, or a thermoset type polymer selected from the group consisting of polyester, epoxy, acrylic, vinyl ester, polyurethane, phenolic, styrene butadiene, silicone, polyimide, polyurea, polysulfone, and nitrophenolics.

13. The method of claim 10 wherein the step of generating a high temperature thermal spray of said powder is performed using a thermal spray gun.

14. The method of claim 13 wherein said powder is sprayed at a velocity of about 10 to 900 mph.

15. The method of claim 14 wherein said powder is sprayed at a velocity of about 700 mph.

16. The method of claim 10 wherein said polymer powder is in the size range of from about 1 to about 250 microns.

17. The method of claim 10 wherein said at least one gas is selected from the group consisting of carbon dioxide, nitrogen, argon, helium, krypton, carbon monoxide, neon, hydrogen, methane, ethane, propane, butane, pentane, hexane, septane, octane, nonane, decane, alcohols, acetylene, propylene, ethylene, butylene, pentylene, hexylene, septylene, octylene and hydrogen sulfide.

18. The method of claim 17 wherein the step of introducing at least one gas is performed using a gas mixture consisting essentially of 90% carbon dioxide and 10% hydrogen.

* * * * *